(12) United States Patent
Fukui et al.

(10) Patent No.: US 6,502,834 B1
(45) Date of Patent: Jan. 7, 2003

(54) HOLDING CHUCK FOR A TIRE-WHEEL WITH A CHATTER-SUPPRESSING DEVICE

(75) Inventors: Katsumi Fukui, Tomakomai (JP); Akihiko Imai, Amagasaki (JP); Hiromasa Tuzuki, Tokoname (JP); Hirokazu Ueda, Inazawa (JP)

(73) Assignees: Howa Machinery, Ltd., Nagoya (JP); Toyota Motor Hokkaido Inc., Tomakomai (JP); Kanzaki Kokyukoki Manufacturing Co., Ltd., Amagasaki (JP)

( * ) Notice: Subject to any disclaimer, the term of this patent is extended or adjusted under 35 U.S.C. 154(b) by 0 days.

(21) Appl. No.: 09/985,584

(22) Filed: Nov. 5, 2001

(30) Foreign Application Priority Data

Nov. 7, 2000 (JP) ........................................ 2000-339503

(51) Int. Cl.[7] .......................... B23B 5/35; B23B 31/107; B23B 31/02
(52) U.S. Cl. ...................... 279/2.04; 279/156; 409/141; 82/153; 82/165
(58) Field of Search ............................... 279/2.05, 2.04, 279/156, 6, 5; 409/141; 82/153, 165

(56) References Cited

U.S. PATENT DOCUMENTS

| 1,691,657 | A | * | 11/1928 | Kempton et al. ............ 279/141 |
| 3,044,791 | A | * | 7/1962 | Nicosia et al. .............. 279/106 |
| 3,131,946 | A | * | 5/1964 | Newhouser ................. 279/133 |
| 3,323,808 | A | * | 6/1967 | Newhouser ................. 279/133 |
| 3,420,538 | A | * | 1/1969 | Benjamin et al. ........... 279/106 |
| 5,464,233 | A | * | 11/1995 | Hanai ......................... 279/106 |
| 5,562,007 | A | * | 10/1996 | Seymour .................... 279/106 |
| 6,126,174 | A | * | 10/2000 | Reece et al. ................ 279/106 |

FOREIGN PATENT DOCUMENTS

| JP | 6-262409 | 9/1994 |
| JP | 10-309611 | 11/1998 |
| JP | 2001-198713 | 7/2001 |

* cited by examiner

Primary Examiner—A. L. Wellington
Assistant Examiner—Don J Bleasdell
(74) Attorney, Agent, or Firm—Finnegan, Henderson, Farabow, Garrett & Dunner, L.L.P.

(57) ABSTRACT

A holding chuck has a clamping device for firmly holding the tire-wheel in the position aligned with a center axis of a holding chuck. Chatter-suppressing dampers are disposed on an intermediate plate fitted around the chuck. The dampers are disposed on circles concentric with the center axis of the holding chuck. Each of the dampers has a damping rod extending in the direction parallel to the center axis and abutting a rim of the wheel. A damper cover is disposed between the rim of the wheel and the dampers and fastened to the holding chuck. The damper cover has slot holes disposed on a circle concentric with the center axis of the chuck which allow the damping rods of the dampers disposed on only one of the concentric circles to extend therethrough and abut the rim of the wheel.

4 Claims, 9 Drawing Sheets

HOLDING CHUCK FOR A TIRE-WHEEL WITH A CHATTER-SUPPRESSING DEVICE

BACKGROUND OF THE INVENTION

1. Field of the Invention

The present invention relates to a holding chuck for a tire-wheel which is equipped with a chatter-suppressing device.

2. Description of the Related Art

When an automobile tire-wheel is machined, the tire-wheel is clamped by a holding chuck, at the center thereof, and mounted on a metal-cutting machine tool. A tire-wheel generally has a relatively large diameter and is fabricated using relatively thin metal plates. Further, when the outer circumference of the tire-wheel is machined, the tire-wheel is gripped at the center thereof by a holding chuck and rotated around its center axis. In this condition, an undesirable chattering (vibration) occurs at the outer circumference of the tire-wheel (i.e., at a rim of the tire-wheel) during machining.

In order to suppress this undesirable chattering, usually, a suppressing device which supports the rim of the tire-wheel during the machining is used.

Figure 8:
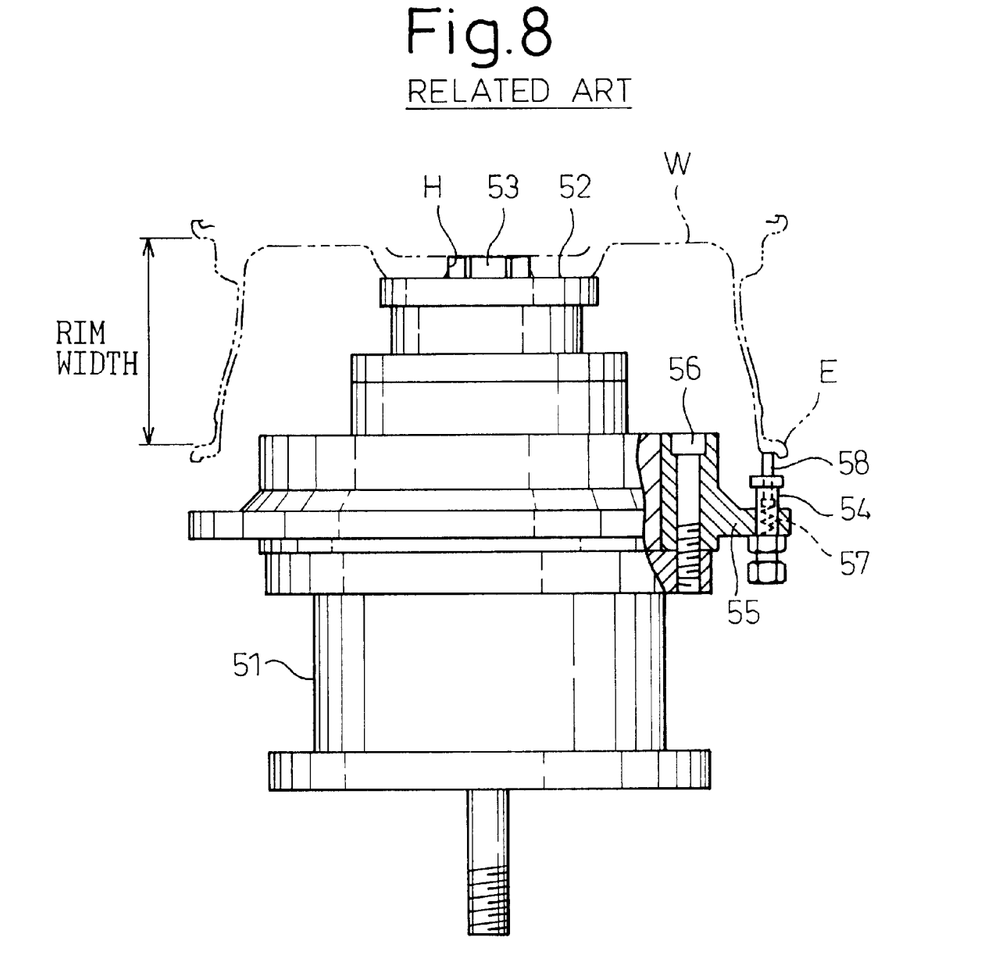
FIG. 8 is a longitudinal section view of a holding chuck equipped with a conventional chatter-suppressing device.
Figure 9:
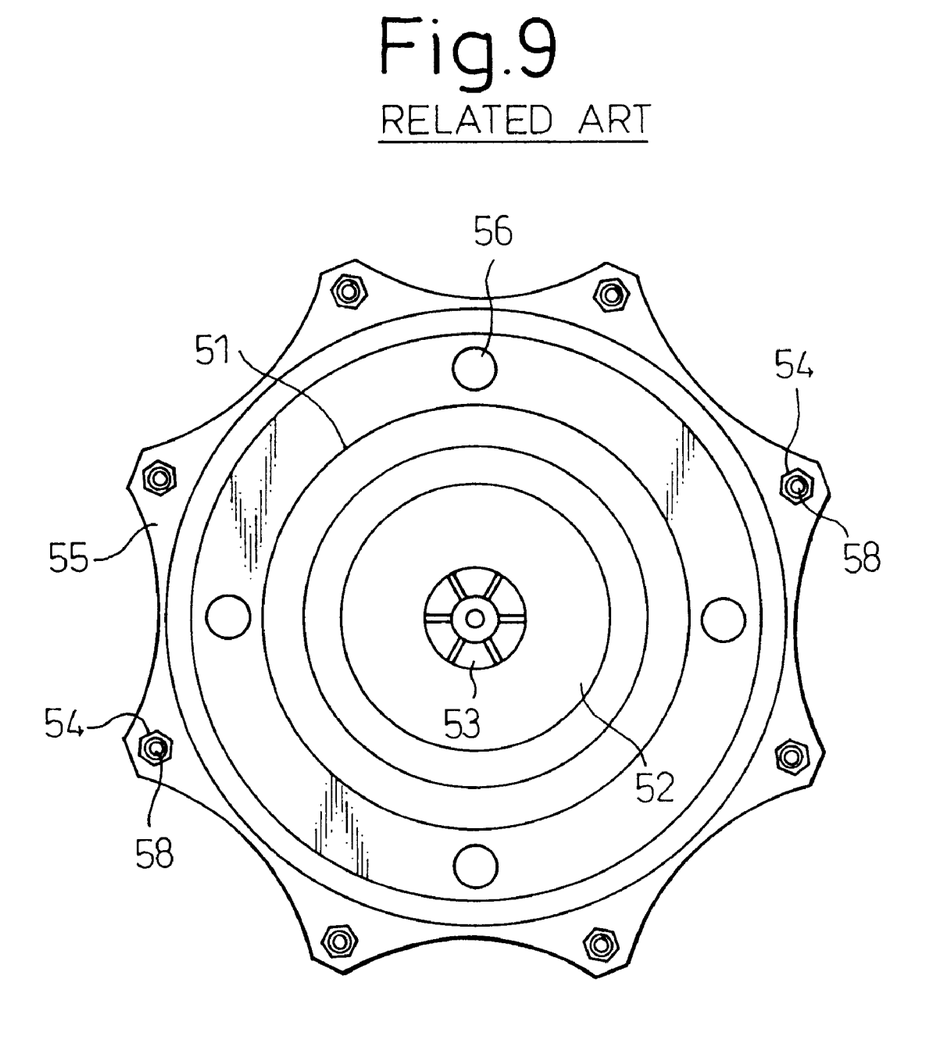
FIG. 9 is a front view of the holding chuck in FIG. 8.

FIGS. 8 and 9 show a holding chuck for a tire-wheel equipped with a conventional suppressing device.

In FIGS. 8 and 9, reference numeral 51 designates a chuck body of a holding chuck for a tire-wheel. The chuck body 51 is provided with a clamp 53 and stopper face 52. When a tire-wheel W is mounted on the chuck body 51, the stopper face 52 abuts the center disk portion of the tire-wheel W, as shown in FIG. 8, and positions the tire-wheel in the direction parallel to the center axis of the chuck body. When the tire-wheel W is placed on the stopper face 52, the clamp 53 is inserted into a center hole H of the tire-wheel w and grips the same so that the tire-wheel W is aligned to the center axis of the chuck body.

Numeral 54 in FIGS. 8 and 9 designates a chatter-suppressing damper. As shown in the drawings, a plurality of dampers 54 are fitted to a rim of a holding ring 55 at regular intervals. The holding ring 55 is detachably attached to the chuck body 51 by bolts 56. Each of the chatter-suppressing dampers includes a damping rod 58 which is urged by a spring 54 toward the tire-wheel and abuts the rim of a tire-wheel in order to prevent the chattering of the rim of the tire-wheel.

However, in the conventional holding chuck, it is necessary to replace the holding ring 55 with one having a different diameter when the size of the tire-wheel to be mounted on the chuck is changed. In other words, different sets of the holding ring 55 and the dampers 54, each matching the tire-wheel of different size, must be prepared and stored. Since the height of the holding ring is relatively large as can be seen from FIG. 8 and the shape thereof is not flat, it is difficult to stack the holding rings in the storage. Thus, the number of the holding rings to be stored and the shapes thereof make the handling of the holding rings inconvenient.

Further, the width of the rim of the tire-wheel changes in accordance with the size (the diameter) of the tire-wheel. In the conventional holding chuck, since the damping rod 58 of the chatter-suppressing damper 54 is urged to the rim of the tire-wheel by the spring 57, the urging force of the spring 57 changes as the width of the rim of the tire-wheel (i.e., the stroke of the damping rod 58) changes. Thus, when the width of the rim is small, the damping rods 58 are pressed against the rim end E (FIG. 8) with insufficient force. In some cases this results in insufficient chatter-suppressing.

SUMMARY OF THE INVENTION

In view of the problems in the related art as set forth above, the objects of the present invention are to provide a holding chuck for a tire-wheel equipped with a chatter-suppressing device which is capable of suppressing the chattering of the tire-wheels of different size without requiring replacement of the holding ring or dampers.

The object as set forth above is achieved by a holding chuck for a tire-wheel with a chatter-suppressing device, according to the present invention, comprising a clamping device inserted into a center hole of a tire-wheel for clamping and holding the wheel in the position aligning a center axis of a holding chuck, a plurality of chatter-suppressing dampers disposed on a plurality of circles concentric with the center axis of the holding chuck, each of the chatter-suppressing dampers being provided with a damping rod extending in the direction parallel to the center axis of the chuck and abutting a rim of the wheel and a damper cover disposed between the rim of the wheel and the chatter-suppressing dampers and fastened to the holding chuck, the damper cover being provided with holes disposed on a circle concentric with the center axis of the chuck and allowing the damping rods of the dampers disposed on only one of the concentric circles matching the concentric circle of the damper cover to extend therethrough and abut the rim of the wheel.

According to the present invention, chatter-suppressing dampers are disposed on the circles concentric with the center axis of the holding chuck. The diameters of the respective circles correspond to the diameters of the tire-wheels of different sizes. Further, although damping rods of all chatter-suppressing dampers are urged towards the rim of the tire-wheel mounted on the holding chuck, the damper cover allows the damping rods of the chatter-suppressing dampers disposed on only one of the concentric circles to pass through the holes of the damper cover and abut the rim of the tire-wheel, i.e., only the damping rod of the chatter-suppressing damper disposed on the circle, the diameter of which matches the size of the tire-wheel mounted on the chuck, are allowed to extend and abut the rim of the tire-wheel. Other damping rods are blocked by the damper cover and do not extend.

Therefore, when the size of the tire-wheel is changed, only the damper cover is required to be replaced with one having a circle of holes matching the size of the tire-wheel. In other words, it is not required to replace the holding ring and chatter-suppressing dampers when the size of the tire-wheel is changed.

The chatter-suppressing damper may be provided with a pneumatic cylinder to extend the damping rod. By urging the damping rod toward the rim of the tire-wheel by air pressure, a uniform force for pressing the damping rod against the rim end of the tire-wheel can be obtained regardless of the size of the tire-wheel and the width of the rim thereof. Thus, a sufficient chatter-suppressing can be obtained regardless of the size of the tire-wheel.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of a holding chuck for a tire-wheel according to the present invention will be explained with reference to FIGS. 1 through 7.

Figure 1:
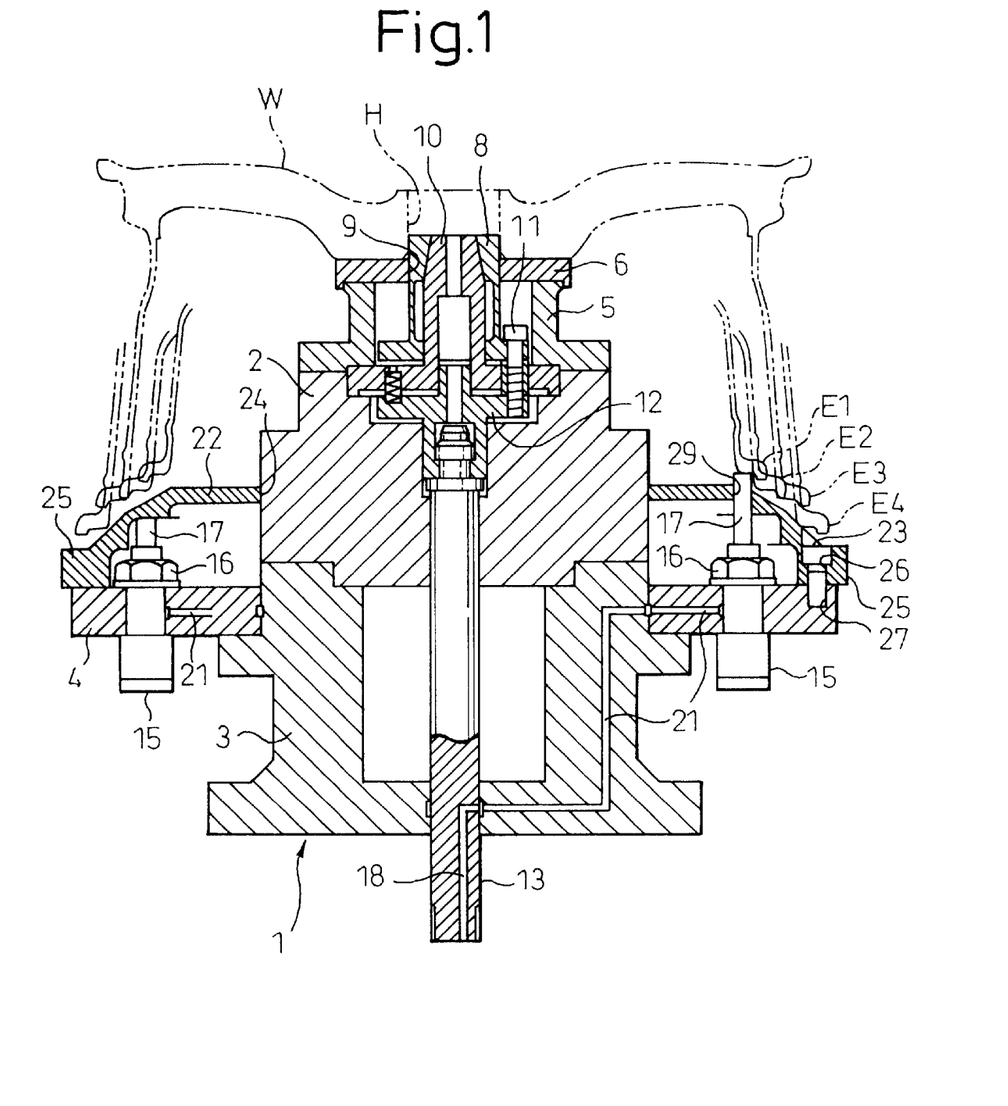
FIG. 1 is a section view taken along the line A—A in FIG. 2 showing a longitudinal section of a holding chuck according to an embodiment of the present invention.

FIG. 1 shows a longitudinal section of an embodiment of the holding chuck according to the present invention. In this embodiment, a chuck body 1 consists of a front body 2, a rear body 3 and an intermediate plate 4. The rear body 3 is mounted on a spindle of a machine tool such as a lathe. A stopper 6 is fixed on the front end of the front body 2 via a cylindrical base 5. When a tire-wheel is mounted on the holding chuck 1, a front end face of the stopper 6 abuts the center disk of the tire-wheel W and positions the tire-wheel on the holding chuck in the direction along the center axis of the holding chuck 1.

A collect type clamp 8 is disposed at the center of the base 5 and the front end thereof extends through a center hole 9 of the stopper 6. A tapered member 10 is disposed at the center of the clamp 8 and a rear end (a base portion) thereof is held between the front body 2 and the base 5.

The clamp 8 is fastened to a draw shaft 13 via another draw shaft 12 and bolts 11. When the draw shaft 13 is retracted toward the rear body 3, the clamp 8 moves toward the rear body 3 with the draw shaft 13 and the clamp 8 is expanded by the tapered member 10. Thus, by inserting the clamp into the center hole H of the tire-wheel W, and by retracting the draw shaft 13, the tire-wheel W is gripped by the clamp 8 at the center thereof in the position aligned to the center axis of the holding chuck 1. Conversely, when the draw shaft 13 extends towards the front direction, the clamp 8 contracts and releases the tire-wheel W.

The chatter-suppressing dampers 15 are firmly fastened to the intermediate plate by nuts 16.

Figure 2:
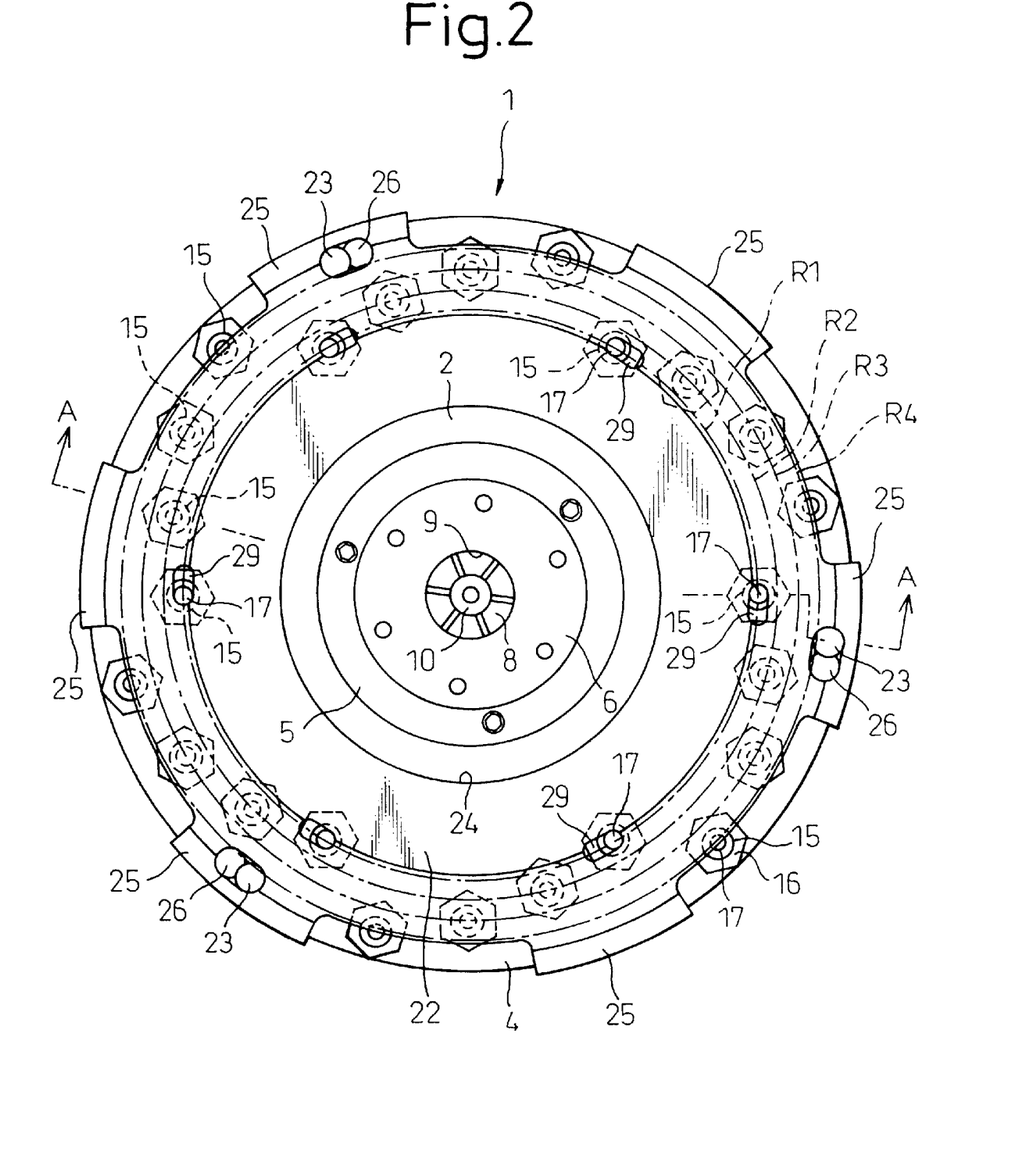
FIG. 2 is a front view of the holding chuck in FIG. 1.

As shown in FIGS. 1 and 2, chatter-suppressing dampers 15 are disposed on the intermediate plate 4. The dampers 15 are disposed on four circles R1 to R4 concentric with the center axis of the chuck 1. The diameters of concentric circles R1 to R4 match the diameters of rim ends E1 to E4, respectively, of tire-wheels of different sizes. On each of the concentric circles R1 to R4, six chatter-suppressing dampers are disposed at regular intervals. The chatter-suppressing dampers 15 on the respective circles R1 to R4 are positioned in such a manner that the dampers 15 on different circles do not overlap each other in the radial direction.

Figure 4:
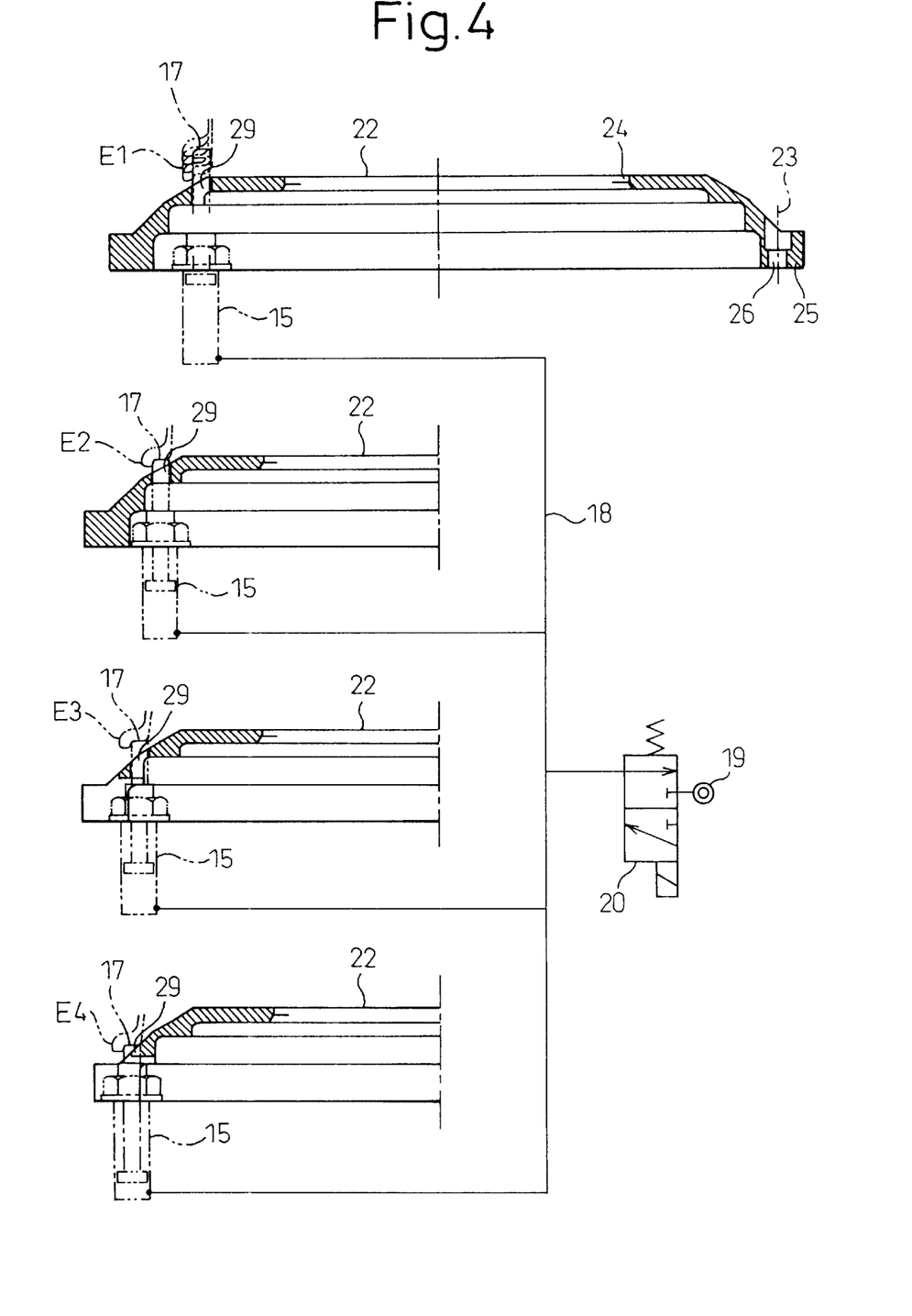
FIG. 4 shows various combinations of the damper covers and the chatter-suppressing dampers on the holding chuck.

Each of the chatter-suppressing dampers 15 is provided with a damping rod 17 which is urged to the rim end E1 to E4 by air pressure and the maximum stroke thereof is set at a length sufficient to abut the most narrow rim end E1. An air passage 18 for supplying pneumatic air is provided in the draw shaft 13. All the dampers 15 are supplied with pneumatic air from the common air passage 18 through air passages 21 disposed in the rear body 1 and the intermediate plate 4. As shown in FIG. 4, the common air passage 18 is connected a control valve 20 of a pressurized air source 19.

Further, as shown in FIG. 1, a damper cover 22 is disposed between the tire-wheel W and the intermediate plate 4. The damper cover 22 is a generally flat shape and covers all of the chatter-suppressing dampers 15 on the concentric circles R1 to R4. The damper cover 22 is fastened to the intermediate plate 4 at the outer periphery thereof by three fastening bolts 23.

Figure 3:
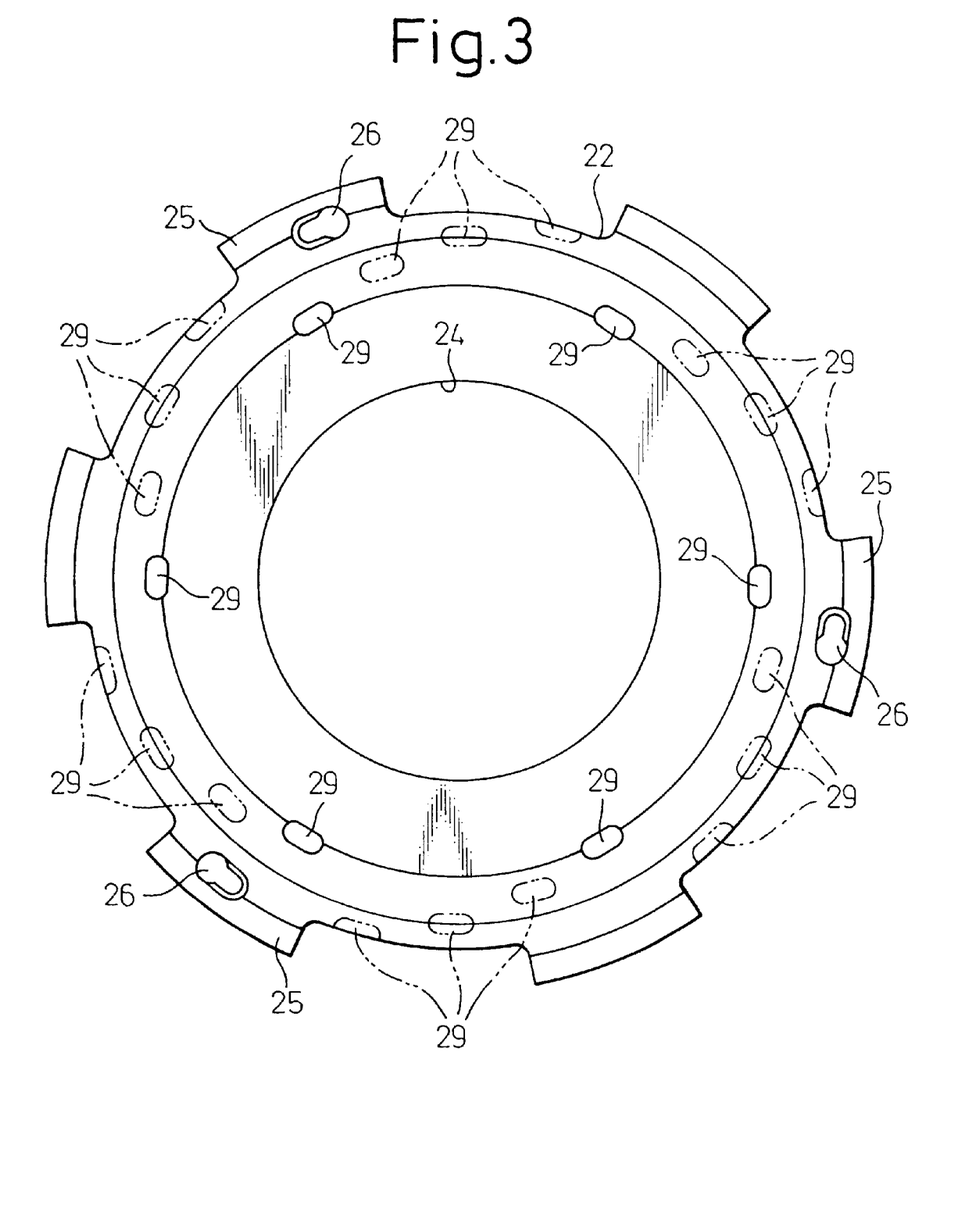
FIG. 3 is a front view of a damper cover of the holding chuck in FIGS. 1 and 2.

FIG. 3 shows a front view of the damper cover 22. The damper cover 22 has a center hole 24 which fits to the outer periphery of the front body 2 of the holding chuck 1. Further, the damper cover 22 is provided with six leg portions 25 disposed on the periphery of the cover 22 at regular intervals and contacting the intermediate plate 4. A slot 26 for the fastening bolt 23 is provided on every other leg portion 25. Three screwed holes 27 for the fastening bolts 23 are formed on the intermediate plate 4 at the outer periphery thereof (FIG. 1).

In this embodiment, four damper covers 15, i.e., a number the same as the number of the types (sizes) of tire-wheels W, have been fabricated beforehand and stored, and a damper cover 22 matching the size of the tire-wheel to be machined has been selected and fastened to the intermediate plate 4 by means of the fastening bolts 23 and the screw holes 27. On the respective damper covers 22, six slot openings 29 having same lengths as the slots 26 are disposed on a circle concentric with the center of the damper cover 22. The circle of the slot openings 29 on each damper cover 22 has a diameter different from each other and matching the diameter of one of the circles R1 to R4 of the chatter-suppressing damper 15. Further, the positions of the slot openings 29 match the position of the damping rods 17 of the respective dampers 15 on the circle. In this embodiment, the openings 29 for the dampers 15 on the largest circle R4 are formed as notches 29 on the outer periphery of the cover 22 instead of slot openings as shown in FIGS. 3 and 4.

For example, on the damper cover 22 in FIG. 2, six slot openings 29 are disposed on a circle having a diameter the same as the smallest circle R1 of the dampers 15 at the position matching the position of the damping rods 17 of the dampers 15 on the circle R1. Therefore, when pressurized air is supplied to all dampers 15, only the damping rods 17 of the dampers 15 on the smallest circle R1 are allowed to extend through the slot openings 29. In this case, the damping rods 17 of the dampers 15 on other circles R2 to R4 are blocked by the damper cover 22 and held at non-active position in which the damping rods 17 abuts the inside surface of the damper cover 22. Therefore, only the damping rods 17 on the circle R1 extend through the slot openings 29 and abut the rim end E1 of the tire-wheel W having the diameter corresponding to the circle R1.

When the size of the tire-wheel to be machined is changed, for example, when the position of the rim end is changed from E1 to E2, only the damper cover 22 is replaced with the one having the slot openings 29 on the circle R2 corresponding to the rim end E2 in this embodiment, and all of the dampers 15 remain on the intermediate plate 4. Therefore, the preparation required for the change of the size of the tire-wheel is largely simplified. Further, since the shape of the damper cover 22 is flat and has no protruding portion, the three damper covers not in use can be conveniently stacked one on another for storage purpose.

Further, since the respective damper covers have a minimum numbers of openings 29, the entry of the cutting chips produced by the machining into the inside of the damper cover can be minimized.

Figure 5A:
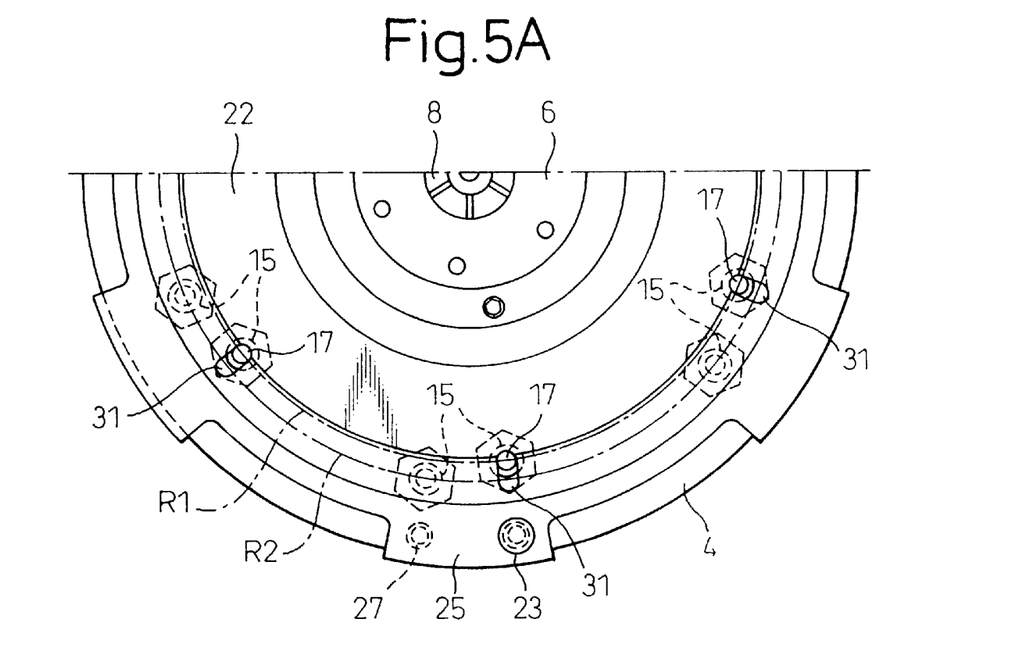
FIGS. 5A and 5B are front views of a holding chuck according to another embodiment of the present invention.
Figure 5B:
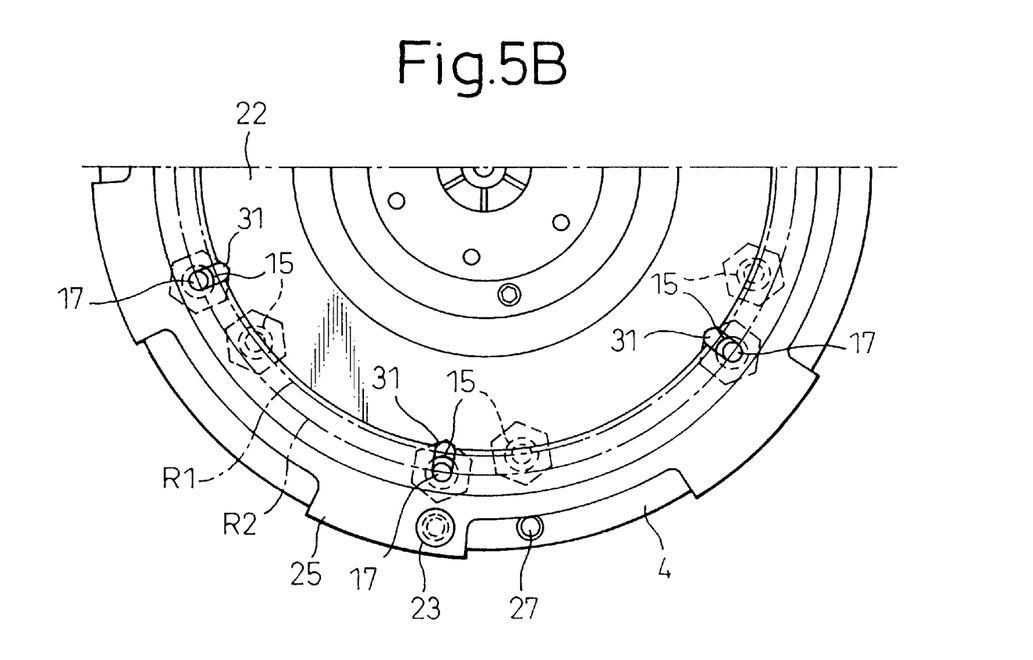

FIGS. 5A and 5B show another embodiment of the present invention. In this embodiment, one damper cover 22 is used for machining two types of the tire-wheels. In this case, chatter-suppressing dampers 15 are disposed on two concentric circles R1 and R2 on the intermediate plate 4. Further, the damper cover 22 has slot openings 31 extending in the radial direction and crossing both circles R1 and R2. Therefore, by turning the damper cover 22, the damping rod 17 to be used can be selected.

For example, when the tire-wheel matching the smaller circle R1 is to be machined, the damper cover 22 is fastened to the intermediate plate 4 at the position shown in FIG. 5A so that only the damping rods 17 of the dampers 15 on the circle R1 are allowed to extend through the slot openings 31. When the tire-wheel matching the larger circle R2 is machined, the damper cover 22 is turned to the position shown in FIG. 5B. In this position, only the damping rods 17 of the dampers 15 on the larger circle R2 are allowed to extend through the slot openings 31. Thus, in this embodiment, the preparation for changes in the size of the tire-wheel to be machined is further simplified.

Next, the chatter-suppressing damper used in the above embodiments is explained in detail.

As explained above, the chatter-suppressing damper in the above embodiments is provided with a damping rod driven by air pressure and pressed against the rim end of the tire-wheel.

Figure 6:
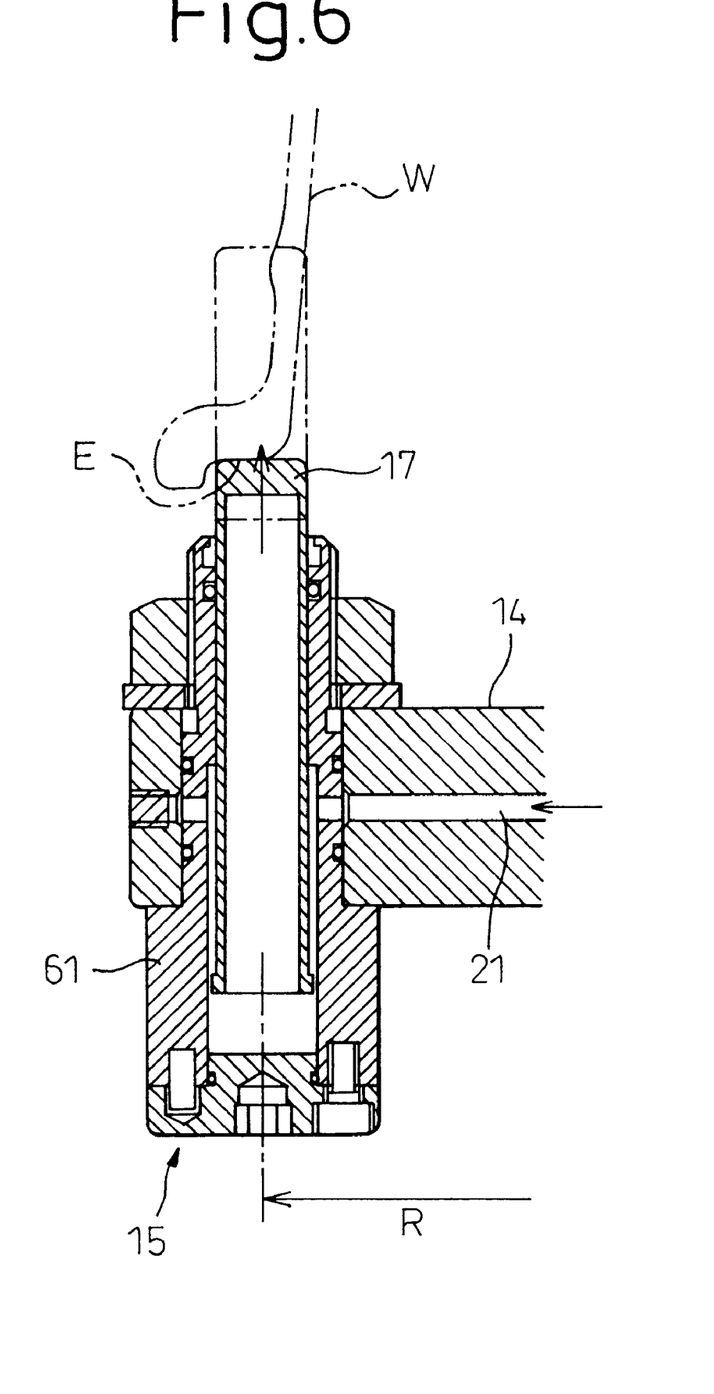
FIG. 6 is a longitudinal section view of an embodiment of the chatter-suppressing damper.

FIG. 6 shows a longitudinal section view of an embodiment of the chatter-suppressing damper 15.

As shown in FIG. 6, the chatter-suppressing damper 15 has a casing 61 functioning as a pneumatic cylinder. A damping rod 17 is fitted in the bore of the casing 61 and capable of sliding within the casing 61 in the direction along the center axis of the casing.

When pressurized air is supplied to the casing 61 through an air passage 21 disposed in the intermediate plate 14, the damping rod 17 is urged by the pressurized air and abuts the rim end E of the tire-wheel W. The force of the damping rod 17 pressing the rim E can be controlled by adjusting the pressure of air. Further, since the damping rod is extended by the pressurized air, the force of the damping rod pressing against the rim end E is not affected by the length of the stroke of the damping rod. Therefore, even if the width of the rim of the tire-wheel is changed, the damping rod 17 can extend or retract within its stroke range and the force of the damping rod 17 pressing against the rim end E does not change.

When the outer periphery of the rim of the tire-wheel is machined, a chattering (a vibration) of the rim may occur. However, since the damping rods 17 of the chatter-suppressing dampers 15 are pressed against the rim end E, the damping rod 17 moves in accordance with the movement of the rim end E and, thereby, the chattering of the rim end E is attenuated.

Though the chatter-suppressing damper 15 in FIG. 6 generally shows a good chatter-suppressing performance by using a pneumatic cylinder, there is a drawback in the chatter-suppressing damper 15 in FIG. 6 that the chatter-suppressing performance deteriorates as the stroke of the damping rod 17 becomes larger.

Since the chatter-suppressing damper 15 rotates together with the tire-wheel during the machining, a centrifugal force F1 is exerted on the damping rod 17 during the machining. When the large stoke of the damping rod 17 is required for a small width rim, the length of the damping rod 17 becomes longer and the mass of the damping rod also becomes larger. The magnitude F1 of the centrifugal force exerted on the damping rod is expressed by the formula $F1=M'R\cdot\omega^2$, where M is a mass of the damping rod 17 and the R is a distance of the damping rod from the center of the holding chuck and $\omega$ is an angle velocity of the rotation of the holding chuck. Therefore, when the stroke of the damping rod 17 is larger, the larger centrifugal force F1 is exerted on the damping rod 17. Since the magnitude of the static friction between the damping rod and the cylinder (housing) is proportional to the magnitude of the centrifugal force F1, the static friction becomes larger as the mass of the damping rod becomes larger. In order to suppress the chattering of the rim, damping rod 17 is required to move back and forth smoothly following the movement of the rim end. However, when the static friction between the damping rod and the housing becomes large, the free movement of the damping rod 17 is hampered by the static friction. This results in insufficient chatter-suppressing performance of the chatter-suppressing damper 15.

Figure 7:
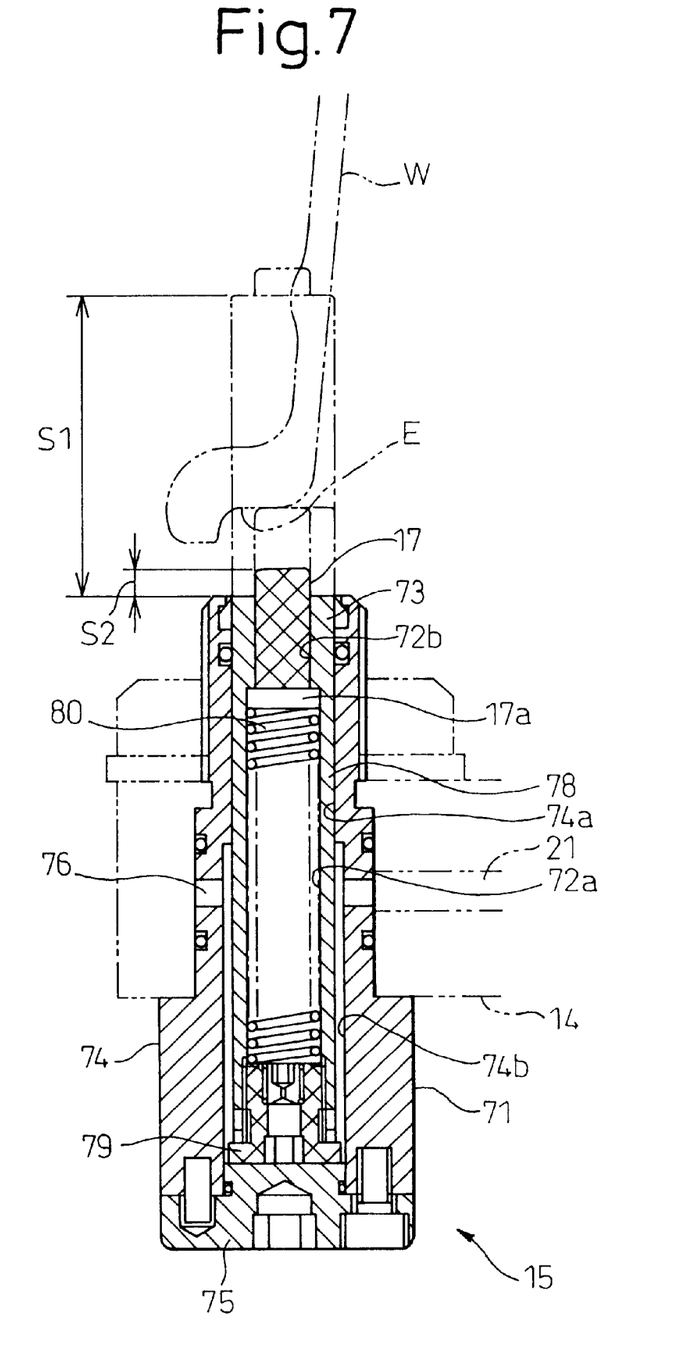
FIG. 7 is a longitudinal section view of an improved embodiment of the chatter-suppressing damper showing the damping rod and the runner cylinder.

FIG. 7 shows another embodiment of the chatter-suppressing damper which is capable of solving this problem.

In this embodiment, the housing 71 of the chatter-suppressing damper 15 also acts as a pneumatic cylinder. However, the damping rod 17 is disposed within a runner cylinder 73 fitted in the housing 71. The runner cylinder 73 acts as a piston driven by the air pressure and moves within the housing 71 in the direction along the center axis of the housing 71.

As shown in FIG. 7, housing 71 consists of a cylinder portion 74 and an end portion 75. In the cylinder portion 74, a bore 74a for bearing a runner cylinder 73 is formed. The lower portion of the bore 74a has a larger diameter and forms an enlarged bore portion 74b which acts as a pressure chamber to which pressurized air is supplied from air inlet/outlet port 76.

The runner cylinder 73 also consists of a cylinder portion 78 and an end portion 79. In the runner cylinder 73, a bore 72b and an enlarged bore 72a are formed. The damping rod 17 is inserted into the bore 72b of the runner cylinder 73 and urged upward direction in FIG. 7 by a bias spring 80 accommodated in the enlarged bore 72a. A flange 17a is formed at the lower end of the damping rod 17 in order to prevent the damping rod from falling out from the bore 72b. The damping rod 17 is urged by the spring 80 and protrudes from the top of the runner cylinder 73.

When pressurized air is supplied to the enlarged bore 74b of the housing 71, the runner cylinder 73 extends upward direction in FIG. 7 and the tip of the damping rod 17 first abuts the rim end E of the tire-wheel. When the runner cylinder 73 further extends, the damping rod 17 is retracted into the runner cylinder 73 while compressing the spring 80. Therefore, the rim end E is supported by the runner cylinder 73. The maximum stroke of the runner cylinder 73 is set at a relatively large length S1 in FIG. 7. Thus, the runner cylinder 73 can accommodate the variation of the width of the rim within the range S1.

On the other hand, the maximum stroke of the damping rod 17 is set at a relatively smaller length S2. Therefore, the mass of the damping rod 17 is relatively small in this embodiment.

During the machining of the tire-wheel, the chatter-suppressing damper 15 rotates with the tire-wheel and centrifugal forces exerts on the runner cylinder 73 and the damping rod 17. Since the mass of the runner cylinder 73 is relatively large, a relatively large centrifugal force is exerted on the runner cylinder 73 and the static friction between the housing bore 72a and the outer surface of the runner cylinder 73 becomes relatively large. Therefore, in some cases, the runner cylinder does not follow the movement of the rim end E and the contact between the tip of the runner cylinder 73 and the rim end E is lost when the rim end moves upward. However, since the centrifugal force exerted on the damping rod 17 is relatively small, the static friction between the bore 72b and the damping rod 17 is relatively small. Therefore, the damping rod 17 can follow the movement of the rim end E even if the free movement of the runner cylinder 73 is hampered by the static friction. Thus, even in the condition where the tip of the runner cylinder 73 is disengaged from the rim end E, the damping rod 17 continues to follow the movement of the rim end E and the tip of the damping rod 17 continues to contact with the rim end E. Thus, the chattering of the rim is always suppressed.

Though the damping rod 17 is urged by the spring 80 in this embodiment, the damping rod 17 may be urged by the pressurized air. In this case, the pressurized air in the enlarged bore 74b is introduced into the enlarged bore 72a of the runner cylinder 73.

In this embodiment, since the static friction exerted on the damping rod 17 is small, the urging force the spring 80 or pressurized air exerts on the damping rod 17 can be set smaller. Therefore, the force exerted on the rim end E from the damping rod 17 become smaller and does not affect the accuracy of the machining while effectively suppressing the chattering of the rim.

What is claimed is:

1. A holding chuck for a tire-wheel comprising;
    a clamping device inserted into a center hole of a tire-wheel for clamping and holding the wheel in the position aligning a center axis of a holding chuck;
    a plurality of chatter-suppressing dampers disposed on a plurality of circles concentric with the center axis of the holding chuck, each of the chatter-suppressing dampers being provided with a damping rod extending in the direction parallel to the center axis of the chuck and abutting a rim of the wheel; and
    a damper cover disposed between the rim of the wheel and the chatter-suppressing dampers and fastened to the holding chuck, the damper cover being provided with holes disposed on a circle concentric with the center axis of the chuck and allowing the damping rods of the dampers disposed on only one of the concentric circles matching the concentric circle of the holes on the damper cover to extend therethrough and abut the rim of the wheel.

2. A holding chuck as set forth in claim 1, wherein each of the chatter-suppressing dampers is provided with a pneumatic cylinder for extending the damper rod towards the rim of the wheel and pneumatic air is supplied from a common air passage disposed in the holding chuck to the respective pneumatic cylinders.

3. A holding chuck as set forth in claim 1, wherein a damper cover is detachably fitted to the holding chuck and, when the size of the tire-wheel to be held by the holding chuck is changed, a damper cover having a concentric circle, the diameter thereof matching the size of the tire-wheel, is selected and fitted to the chuck.

4. A holding chuck as set forth in claim 1, wherein each of the chatter-suppressing damper comprises a runner cylinder and an actuator for extending and contracting the runner cylinder along the direction parallel to the center axis of the holding chuck and a bias means disposed between the runner cylinder and the damping rod for elastically urging the damping rod toward the rim of the tire-wheel.

* * * * *